(12) United States Patent
Beckey

(10) Patent No.: US 9,747,085 B2
(45) Date of Patent: Aug. 29, 2017

(54) SOURCE CODE GENERATION FROM PROTOTYPE SOURCE

(71) Applicant: PAYPAL, INC., San Jose, CA (US)

(72) Inventor: Christopher T. A. Beckey, Baltimore, MD (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/967,122

(22) Filed: Dec. 11, 2015

(65) Prior Publication Data
US 2017/0168786 A1   Jun. 15, 2017

(51) Int. Cl.
  G06F 9/44   (2006.01)
  G06F 9/45   (2006.01)

(52) U.S. Cl.
  CPC . G06F 8/41 (2013.01); G06F 8/73 (2013.01)

(58) Field of Classification Search
  CPC .................................... G06F 8/41; G06F 8/73
  See application file for complete search history.

(56) References Cited

U.S. PATENT DOCUMENTS

| | | | |
|---|---|---|---|
| 6,066,181 A | 5/2000 | DeMaster | |
| 6,088,698 A * | 7/2000 | Lipkin | G06F 17/30398 |
| 6,742,175 B1 | 5/2004 | Brassard | |
| 7,152,229 B2 | 12/2006 | Chong et al. | |
| 7,761,843 B2 | 7/2010 | Ortscheid | |
| 8,127,272 B2 | 2/2012 | Gownder et al. | |
| 8,549,489 B2 | 10/2013 | Ortscheid | |
| 8,694,978 B1 * | 4/2014 | Rus | G06F 8/443 717/140 |
| 2002/0013862 A1 | 1/2002 | Orchard et al. | |
| 2002/0186245 A1 * | 12/2002 | Chandhoke | G05B 19/0426 715/764 |
| 2004/0254944 A1 * | 12/2004 | Simpson | H04L 12/24 |
| 2006/0206890 A1 * | 9/2006 | Shenfield | G06F 8/20 717/174 |

(Continued)

OTHER PUBLICATIONS

GitHub, joelittlejohn/jsonschema2pojo, https://github.com/joelittlejohn/jsonschema2pojo, 2016, 2 pages.

(Continued)

*Primary Examiner* — Chameli Das
(74) *Attorney, Agent, or Firm* — Haynes and Boone, LLP

(57) ABSTRACT

Methods, systems, and computer program products for generating source code from a compilable annotated source code prototype are disclosed. A computer-implemented method may include receiving two or more schemas that each describe attributes of respective source code modules to be generated by a source code generator, receiving a compilable source code prototype comprising annotations associated with the source code generator to generate each of the respective source code modules, detecting the annotations from the source code prototype as part of generating the respective source code modules, determining that one or more of the annotations from the source code prototype correspond with one or more attributes of a schema associated with one of the respective source code modules to be generated, and generating each of the respective source code modules based on the annotations from the source code prototype in view of attributes described in an associated schema.

19 Claims, 4 Drawing Sheets

(56) References Cited

U.S. PATENT DOCUMENTS

| | | | |
|---|---|---|---|
| 2008/0033802 A1* | 2/2008 | McKenna | G06Q 30/02 |
| | | | 705/14.4 |
| 2008/0066053 A1* | 3/2008 | Ramamoorthy | G05B 19/0426 |
| | | | 717/114 |
| 2008/0263505 A1* | 10/2008 | StClair | G06F 8/10 |
| | | | 717/101 |
| 2009/0006454 A1* | 1/2009 | Zarzar | G06F 17/2247 |
| 2009/0132995 A1* | 5/2009 | Iborra | G06F 8/30 |
| | | | 717/106 |
| 2009/0154697 A1* | 6/2009 | Shen-Orr | G06F 21/10 |
| | | | 380/210 |
| 2010/0192122 A1* | 7/2010 | Esfahan | G05B 19/0426 |
| | | | 717/105 |
| 2014/0007044 A1 | 1/2014 | Aliseychik et al. | |
| 2014/0207830 A1* | 7/2014 | Holmes | G06F 17/30292 |
| | | | 707/804 |

OTHER PUBLICATIONS

Java Code Generation, Eclipsepedia, https://wiki.eclipse.org/Java_Code_Generation, Sep. 12, 2014, 6 pages.

\* cited by examiner

SOURCE CODE GENERATION FROM PROTOTYPE SOURCE

TECHNICAL FIELD

The present disclosure generally relates to computer systems and, more particularly, to the generation of computer source code and instructions for execution by computer systems, computer networks, or Internet services.

BACKGROUND

Computer programming generally refers to a manual process where humans provide instructions to a machine for processing and execution. For example, computer programmers enter source code written in a computer programming language into a source code editor or integrated development environment (IDE). A compiler transforms or "compiles" the source code into a lower-level machine-readable language, such as assembly language or machine code, for execution by a machine. Additionally, some compilers may compile source code into an intermediate language for execution by an interpreter computer program of a runtime environment.

Automated source code generation refers to the process of automatically creating source code from visual elements placed in a graphical user interface (GUI) builder, using input provided to a wizard program, programmatically, or based on templates written in a custom format other than the computer language of source code that is to be generated. However, such methods of automated source code generation suffer from various deficiencies. For instance, GUI builders and wizard-based source code generators produce a limited amount of non-operational "starter" source code (e.g., outlines, skeletons, or stubs). Computer programmers then apply a significant amount of manual effort to augment the small amount of generated source code to create a functioning software application. In addition, programmatic source code generation is complex, cumbersome, and prone to high-level syntactic errors.

Template-based source code generators use custom syntax and formatting that introduces increased complexity for computer programmers. For example, template-based solutions involve a proprietary validator to check and flag errors in the custom syntax and formatting of associated templates. However, these proprietary validators are unable to detect syntactical errors present in computer language source code that is to be generated from a template. Therefore, most errors present in source code generated from custom templates are detected after source code already has been generated from a template. As a result, computer programmers perform the tedious and time-consuming tasks of repetitively modifying a template and regenerating the same desired source code until the generated source code successfully compiles and executes in the target computer language. Accordingly, providing new, improved, and more accurate ways of generating source code is of importance.

BRIEF DESCRIPTION OF THE DRAWINGS

Various examples of the present disclosure will be understood more fully from the detailed description given below and from the accompanying drawings of various examples of the disclosure. In the drawings, like reference numbers may indicate identical or functionally similar elements. The drawing in which an element first appears is generally indicated by the left-most digit in the corresponding reference number.

DETAILED DESCRIPTION

Systems, methods, and computer program products for generating source code modules from compilable source code prototypes are disclosed. In examples of the present disclosure, a source code generation system receives a compilable source code prototype comprising source code generation annotations to generate one or more source code modules. A user may compile, test, debug, and execute the source code prototype before generating source code modules from the prototype, for example, to verify that generated source code modules are reliable or defect-free.

In an example, the source code generation system also receives two or more schemas that each describe attributes of respective source code modules to be generated from the source code prototype. The source code generation system then generates each of the source code modules from the source code prototype based on annotations in the source code prototype and associated attributes described in a corresponding schema. For example, the source code generator may match an annotation from the source code prototype with one or more attributes from a schema associated with a respective source code module being generated. The source code generation system then may modify one or more sections of the source code prototype (or an associated copy) by updating the source code prototype with data from an associated section of a schema corresponding to the respective source code module being generated.

Accordingly, aspects of the present disclosure describe various ways of efficiently generating highly reliable source code.

Figure 1:
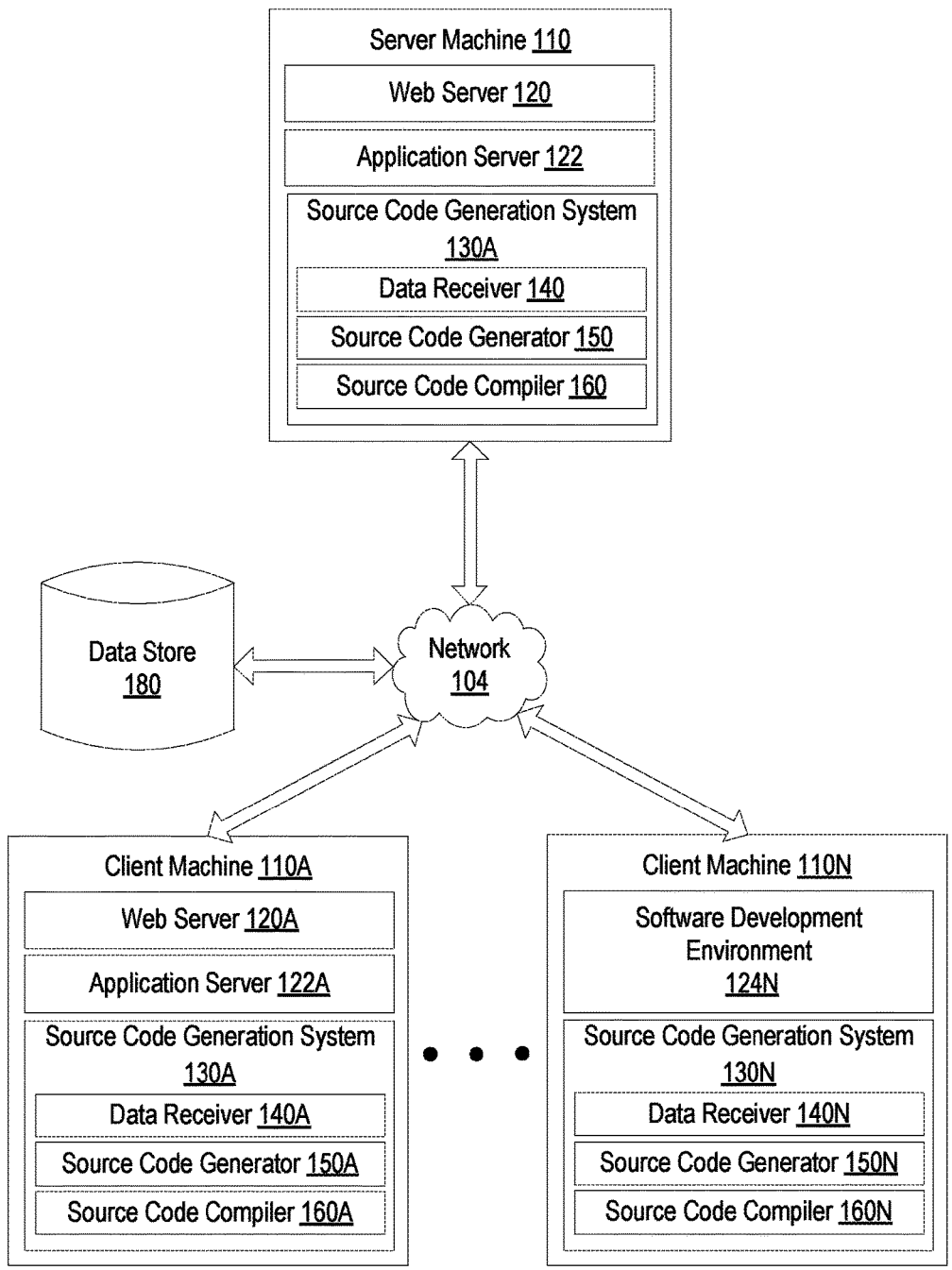
FIG. 1 is a block diagram illustrating a system architecture, in accordance with various examples of the present disclosure.

FIG. 1 illustrates an exemplary system architecture 100 in which examples of the present disclosure may be implemented. System architecture 100 includes one or more server machines 110 one or more data stores 180, and one or more client machines 102A, 102N connected via one or more networks 104.

Network 104 may be a public network (e.g., the Internet), a private network (e.g., local area network (LAN) or wide area network (WAN)), or any combination thereof. In an example, network 104 may include the Internet, one or more intranets, wired networks, wireless networks, and/or other types of communication networks. Network 104 also may comprise a wireless telecommunications network (e.g., cellular phone network) adapted to communicate with other communication networks, such as the Internet. In addition, network 104 may include one or more short-range wireless networks or beacon networks.

Data store 180 generally refers to persistent storage capable of storing various types of data, such as text, audio, video, images, source code, executable computer instructions, software applications, or generally any form of content. In some examples, data store 180 may include a network-attached file server, while in other examples data store 180 may include other forms of persistent storage such as an object-oriented database, a relational database, a source code revision and control system, and so forth.

Client machines 102A, 102N generally may be a personal computer (PC), laptop, mobile phone, tablet computer, server computer, wearable computing device, or any other type of computing device (i.e., a client computing device). Client machines 102A-102N may run an operating system (OS) that manages hardware and software of the client machines 102A-102N. A browser (not shown) may run on client machines 102A-102N (e.g., on the OS of client machines 102A-102N).

The browser may be a web browser that can access content and services provided by web server 120, application server 122, or a combination of web server 120 and application server 122. For example, such content and services may be provided via a cloud or network-based application development environment (e.g., a web-based integrated development environment) for writing, generating, testing, and deploying various types of software applications. In an example, a web-based integrated development environment (IDE) may be provided in a web browser or any other type of application delivered via a network protocol (e.g., a smart client IDE delivered via Hypertext Transfer Protocol). In addition, other types of computer programs and scripts may be provided to and run on client machines 102A-102N.

Server machine 110 may include one or more web server(s) 120 and/or one or more application server(s) 122. For example, web server 120 may provide text, audio, video, images, source code, executable computer instructions, software applications, cloud-based software development environments, and/or other various types of content to and from server machine 110 or other sources (e.g., data store 180 and/or client machines 102A-102N). Web server 120 also may provide various web-based applications, services, business logic, and updates to server machine 110 and/or client machines 102A-102N. Server machine 110 may locate, access, and consume various forms of content and services from a trusted (e.g., internal, known, associated) web server 120 or application server 122 and/or various other (e.g., external, unknown, unassociated) web and application servers. Web server 120 also may receive text, audio, video, images, source code, executable computer instructions, software applications, cloud-based software development data, and/or other various types of content from client machines 102A-102N, which may be stored in data store 180 for preservation and/or sharing of content.

In an example, web server 120 is coupled to an application server 122 that provides application services, data, business logic, and/or APIs to server machine 110 and/or client machines 102A-102N. In some examples, application server 122 provides one or more such services independently, without use of web server 120.

In an example, web server 120 may provide server machine 110 and client machines 102A-102N with access to one or more application server 122 services associated with a cloud, network, or web-based source code generation system 130-130N, or other type of source code generation system 130-130N. Such functionality also may be provided as part of one or more different web applications, standalone applications, systems, plug-ins, web browser extensions, and application programming interfaces (APIs), etc. In some examples, plug-ins and extensions generally may be referred to, individually or collectively, as "add-ons."

In an example, client machines 102A-102N may include or use an application associated with a service provided by server machine 110 (e.g., source code generation system 130-130N). For example, various types of computing devices (e.g., smart phones, smart televisions, tablet computers, smart wearable devices, smart home computer systems, etc.) may use specialized applications to access services provided by server machine 110, to issue commands to server machine 110, and/or to receive content from server machines 110-110N with or without visiting or using web pages.

Server machine 110 and each of the client machines 102A-102N may include respective data receiver 140-140N modules, source code generator 150-150N modules, and source code compiler 160-160N modules. In various examples, such modules may be combined, divided, and organized in various arrangements on one or more computing devices. Client machines 110A-110N each also may include a respective software development environment 112A, 112N. A software development environment generally refers to a software application, such as an integrated development environment (IDE) that allows users to design, write, generate, compile, test, debug, and deploy computer source code and/or associated machine instructions.

In an example, one or more functions performed by server machine 110 also may be performed by client machines 102A-102N, in whole or in part. In addition, functionality attributed to a particular component may be performed by different or multiple components operating together. Server machine 110 may be accessed as a service provided by systems or devices via appropriate application programming interfaces (APIs) and data feeds, and thus are not limited to use with websites.

Figure 2:
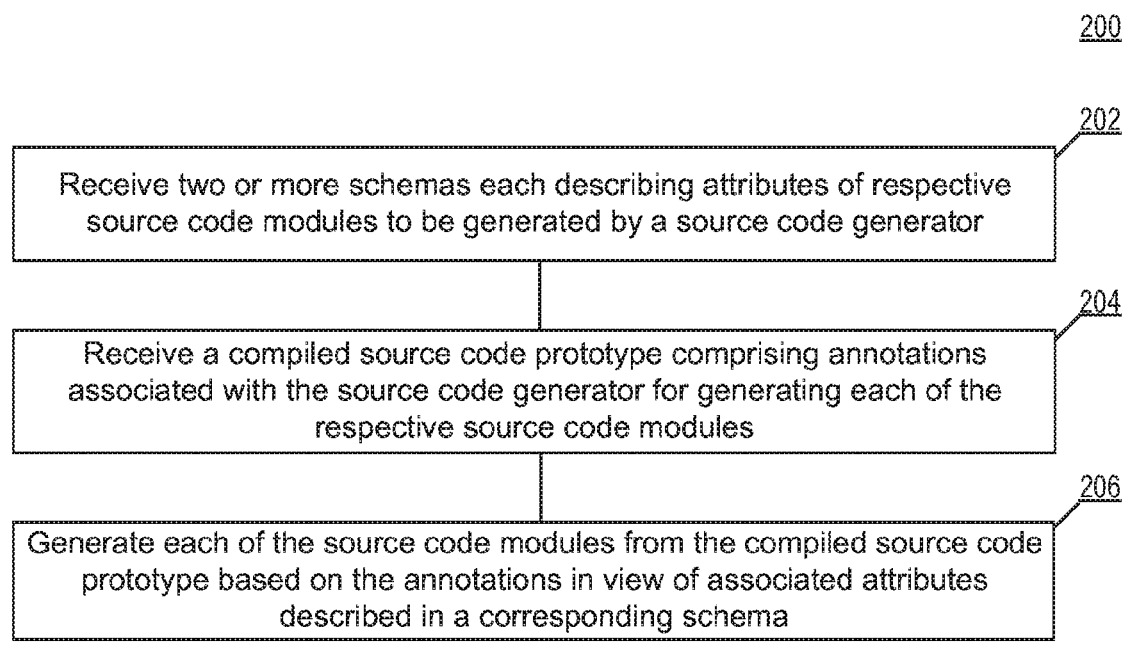
FIG. 2 is a flow diagram for generating source code from prototype source based on one or more schemas.

FIG. 2 is a flow diagram for generating source code from prototype source based on one or more schemas. The method 200 may be performed by processing logic that may comprise hardware (e.g., circuitry, dedicated logic, programmable logic, microcode, etc.), software (e.g., instructions run on a general purpose computer system, dedicated machine, or processing device), firmware, or a combination thereof. Examples of method 200 are described with respect to source code generation system 130 for the sake of consistency. In addition, such examples generally apply to other examples of source code generation systems 130A, 130N as described herein.

Method 200 begins at block 202 when data receiver 140 of source code generation system 130 receives two or more schemas that each describe attributes of respective source code modules to be generated by source code generator 150. In an example, a user or computer program may invoke source code generation system 130 to automatically generate a source code module for each of the two or more schemas based on a compilable, annotated source code prototype. For example, a software developer may use source code generation system 130 to generate multiple different source code modules for a software application using a source code prototype and a set of schemas each describing attributes of respective source code modules to be generated.

A software developer also may use a plurality of different source code prototypes to generate various source code modules based on one or more different sets of schemas. In an example, different source code prototypes may include, but are not limited to, (1) a source code prototype for generating mutable source code modules with private fields and associated accessor and mutator methods, (2) a source code prototype for generating immutable classes having an inner builder class associated with a builder pattern, and (3)

a source code prototype for generating immutable classes with "morph" fields to allow Java Specification Request (JSR) validation (e.g., JSR-303, JSR-349, etc.) or other validation to be performed on custom field types.

In an example, a "morph" field generally refers to a special field where two versions of the same information are maintained and kept in sync. In one example, a first version of a "morph" field (e.g., telephone number) appears as a String object externally or outside of a source code module. In addition, the source code module maintains an associated second version of the "morph" field in a validated format (e.g., a custom telephone number data type or object providing internal visibility and validation). Further, the source code module keeps the two versions of the field in sync to allow external visibility/usage in one format or data type (e.g., Object, String, alphanumeric, numeric, etc.) and internal source code visibility and validation in another format (e.g., telephone number, driver license number, payment identifier, personal identifier, and other custom data types or objects).

A source code prototype generally describes an existing source code module written or created in a standard computer language that is compilable by a native or standard computer language compiler. For example, a source code prototype may be a source code file written in the Java® programming language that is compilable using an industry standard or compliant Java® compiler. Thus, a source code prototype generally is a syntactically correct and compilable module of source code written in the same language as source code that is to be generated. In some examples, source code prototypes may be compilable, compiled, or executable source code modules represented as source code, as an intermediate computer language (e.g., a Java® class file or other file comprising an intermediate language), or as machine-readable instructions.

In general, compilable, annotated source code prototypes allow software developers to generate source code modules using a known computer language without having to learn additional, non-essential proprietary syntax and formatting associated with template-based solutions. In addition, compilable native source code prototypes allow developers to compile and test source code prototype using familiar software development tools, including but not limited to, source code editors, compilers, debuggers, and other utilities, prior to generating source code modules. Allowing such analysis and testing on the source code prototype prior to source code generation is beneficial because it provides software developers with an opportunity to identify, examine, and resolve issues with source code efficiently for the purpose of ensuring that source code modules eventually generated from the source code prototype will successfully compile and operate as intended.

In an example, a compilable source code prototype comprises source code written in a computer language and one or more annotations associated with source code generator 150 of source code generation system 130. In one example, annotations associated with source code generator 150 are situated in various locations of a source code prototype. In addition, such annotations provide flags or instructions that code generator 150 uses when generating source code modules. For example, the source code generator 150 annotations may be included in a source code prototype as comments or other special statements that are ignored by a compiler and retained in the source code prototype for processing by code generator 150. In general, annotations are a special type of metadata that signal to code generator 150 which elements of a source code prototype are to be refactored when generating a source code module based on a schema.

At block 204, data receiver 140 of source code generation system 130 receives two or more schemas each describing attributes of respective source code modules to be generated by source code generator 150. In an example, each schema indicates a definition or interface specification of a source code module to be generated by source code generation system 130. For example, each schema may define one or more attributes of a source code module that is to be generated. Such attributes may include, but are not limited to, a source code module name, a source code module access modifier (e.g., public, private, protected, default, etc.), source code module variable names and types, source code module variable values, source code module variable access modifiers, source code module function and method names, one or more nested modules, or generally any other information describing attributes of a source code module that is to be generated from a source code prototype.

In general, a source code schema definition generally refers to any representation of a source code module that is to be generated. For example, one or more example schema formats may include, but are not limited to, name-value pairs, JavaScript Object Notation (JSON) schemas, Extensible Markup Language (XML) schemas, XML Schema Definition (XSD) schemas, etc. In various examples, these and other schema formats generally may be used to represent attributes, structure, interfaces, and other information used by source code generator 150 to generate an associated source code module from a source code prototype. Further, source code modules generally refer to any unit of compilable or executable source code or instructions. For example, various types of source code modules that may be generated include objects, classes, packages, sub-packages, libraries, executable instructions, or any other various units of source code or instructions.

At block 206, source code generator 150 of source code generation system 130 generates each of the respective source code modules based on the annotations from the source code prototype in view of attributes described in an associated schema. In an example, a user invokes source code generation system 130 using one or more invocation options that provide source code generation system 130 with preliminary information and instructions for generating source code modules.

In an example, a user may invoke source code generation system 130 using a command line interface, a software development environment, a software development environment add-on or plug-in (e.g., a Maven plug-in), a build task, a package, a library, a programmatic call, an application programming interface (API), a web service, or in one or more other ways. In various examples, invocation options associated with source code generation system 130 generally allow a user to indicate various information and instructions that source code generator 150 uses to process annotations in a source code prototype, to perform source code generation based on a source code prototype and a schema, to locate and identify a source code prototype, to locate and identify one or more schemas, to identify a target location for generated source code, etc.

In an example, source code generator 150 generates source code modules for each schema received in block 202 by applying each specific schema to the source code prototype received in block 204. For example, source code generator 150 may generate a Plain Old Java® Object (POJO) for each of a plurality of JSON schemas that each describe a source code module that is to be generated from a compilable Java® source code prototype comprising a plurality of source code generator 150 annotations. In one example, source code generator 150 generates a compilable and executable mutable POJO object comprising accessors and mutators (e.g., getter and setter methods) from a compilable Java® source code prototype based on a schema definition. While various examples in the present disclosure are described using the Java® computer programming language, such examples are applicable and generally may be performed using any computer programming language (e.g., C#, C, C++, Python, etc.).

In an example, source code generator 150 analyzes a compilable Java® source code prototype to detect one or more source code generator 150 annotations present in the source code prototype. For example, a compilable Java® source code prototype may comprise one or more top-level class annotations, builder class annotations, nested inner class annotations, array type annotations, or other types of source code generator 150 annotations.

In various examples, one or more different top-level class annotations may be used (1) to identify a root class to use for generating Java® source code from a schema, (2) to identify a constructor that is to be refactored as part of code generation based on attributes provided in a schema, (3) to identify one or more fields to be used as prototypes for generating field declarations, (4) to identify a method to be used as an accessor prototype, (5) to identify a method to be used as a mutator prototype, (6) to identify a method to be used as a builder factory method, and (7) to identify a constructor from a builder implementation to create a class instance.

In various examples, one or more different builder class annotations may be used to create classes as inner, public, and static, to avoid large constructors for immutable classes. In one example, one type of builder class annotation may be used to annotate an inner class within a source code prototype that is to be used as a prototype builder. In addition, another type of builder class annotation may be used to annotate the build( )method of a builder class.

In various examples, different nested inner class annotations may be used (1) to indicate a class in a source code prototype that is to be used as an inner class, (2) to mark a source code prototype inner class as a constructor, accessor, or mutator, and (3) to indicate whether an inner class that is to be generated should be accessible within a source code module (locally), by source code units within a system or application (intra-module), or by external systems/applications (externally). In addition, different array type annotations may be used (1) to identify a field to use as a prototype for an array associated with unique elements, and (2) to identify a field to use as a prototype for an array associated with non-unique elements.

In an example, source code generator 150 identifies one or more annotations in a compilable Java® source code prototype. For example, source code generator 150 may identify an annotation based on a special source code generation keyword, one or more special characters, or a combination of special keywords and characters. In one example, source code generator 150 processes annotations present in a source code prototype based on a sequence. For example, source code generator 150 may process one or more of the annotations based on an ordering of the annotations in a source code prototype file or associated representation. Source code generator 150 also may process one or more of the annotations based on a predefined ordering associated with one or more of annotations, a source code prototype, a schema, or a source code module being generated. In one example, source code generator 150 searches a source code prototype for one or more annotations to process based on a predetermined order of source code generation processing.

In an example, source code generator 150 creates a copy of a source code prototype being used to generate a source code module from a schema. For example, source code generator 150 may create a new file or in-memory representation of the source code prototype that source code generator 150 then may refactor the copy of the source code prototype by inserting, replacing, updating, deleting, or otherwise modifying various sections and/or annotations in the source code prototype based on the schema.

In an example, source code generator 150 determines that an annotation detected in a source code prototype is to be processed as part of generating a source code module from a schema. Source code generator 150 then analyzes the schema describing attributes of the source code module being generated to identify information in the schema associated with an annotation being processed from the source code prototype. For example, source code generator 150 may use a file name of the schema or a file name present in the schema to name the source code module that is being generated (e.g., a Java® class). Source code generator 150 also may identify type declarations and fields from the associated schema to use when processing corresponding annotations from the source code prototype.

In an example, source code generator 150 inserts information from a schema into a copy of the source code prototype, removes one or more processed annotations from the copy of the source code prototype, and stores an updated copy of the source code prototype applied with information from the schema in a target location as the generated source code module. In various examples, a source code module generated by source code generator 150 is a compilable and executable unit of source code or machine instructions that may be used without further modification by a user.

Figure 3:
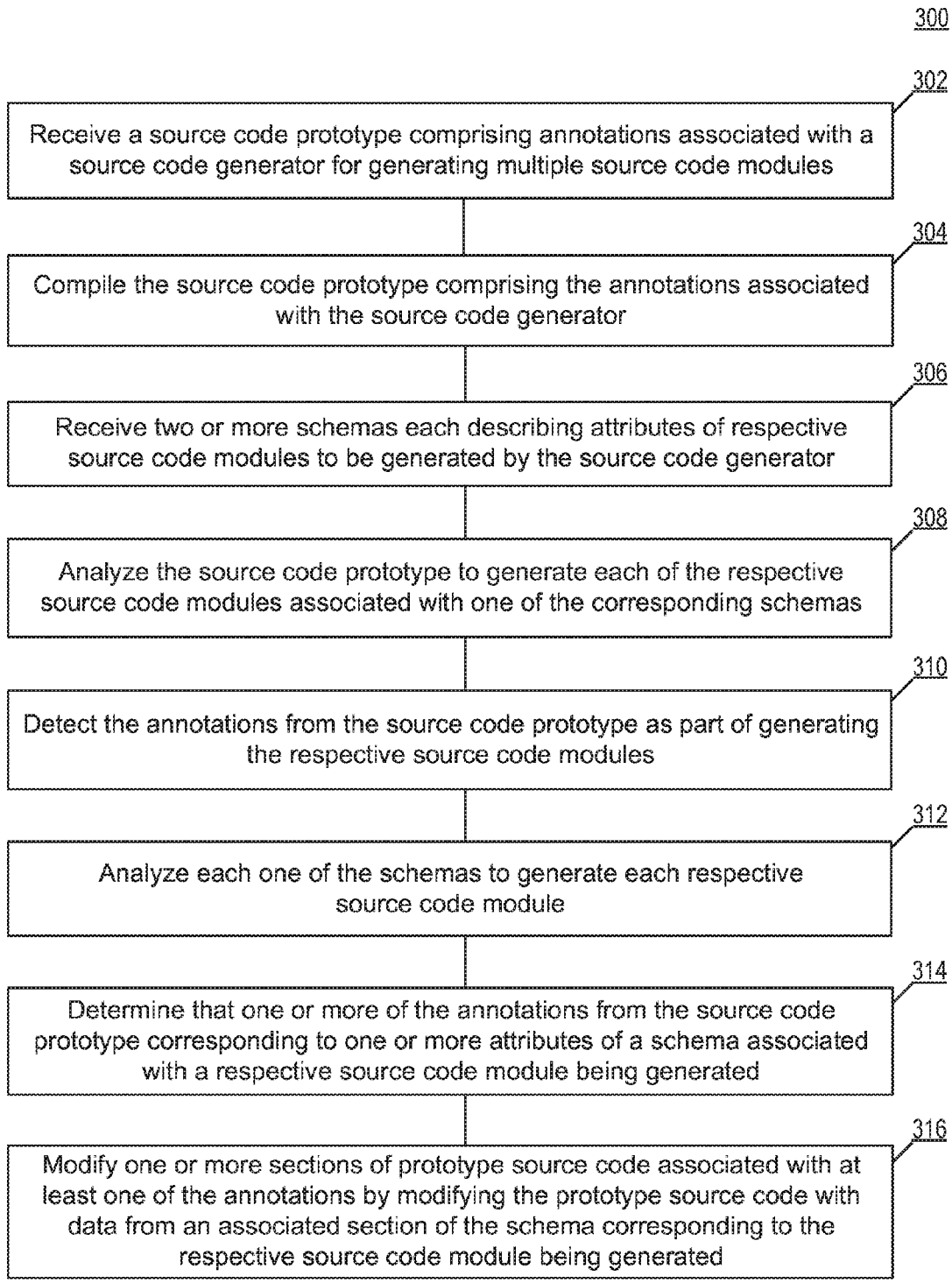
FIG. 3 is a flow diagram for generating source code from compilable prototype source based on one or more schemas.

FIG. 3 is a flow diagram for generating source code from compilable prototype source based on one or more schemas. The method 300 may be performed by processing logic that may comprise hardware (e.g., circuitry, dedicated logic, programmable logic, microcode, etc.), software (e.g., instructions run on a general purpose computer system, dedicated machine, or processing device), firmware, or a combination thereof. Examples of method 300 are described with respect to source code generation system 130 for the sake of consistency. In addition, such examples generally apply to other examples of source code generation systems 130A, 130N as described herein.

Method 300 begins at block 302 when data receiver 140 of source code generation system 130 receives a source code prototype comprising annotations associated with a source code generator for generating multiple source code modules. In an example, a user invokes source code generation system 130 to automatically generate multiple source code modules from each of multiple schemas using a compilable, annotated source code prototype. In various examples, a user provides one or more invocation options and/or parameters to source code generation system 130 for the source code generation. For example, a user may provide a location and identity of a compilable, annotated source code prototype to generate source code modules from each of a plurality of different schemas. In an example, a compilable, annotated source code prototype is a source code module in a standard computer language (e.g., Java, C#, C, C++, Python, etc.) that is or compilable or has been compiled by a compiler associated with the computer language.

In an example, source code generation system 130 accepts and processes one or more invocation options and/or parameters associated with generating source code. For example, various invocation options and/or parameters may include, but are not limited to (1) an option to specify a directory or target location where generated source code modules are to be generated, (2), an option to specify a directory, source location, or directory tree where source schema files are located, (3) an option to specify a base package name for generated source code modules, (4) an option to specify a location, link, or URL indicating a source code prototype file to use for generating respective source code modules from corresponding schemas, (5) an option to specify a mapping file to supplement or modify schemas in one or more ways prior to source code module generation, (6) an option to specify a relative location of source code modules generated from an embedded schema (e.g., within a parent source code module, as a top-level source code module, etc.), (7) an option to generate JSR-303/349 constraints or other validation as specified in a source schema, (8) an option to specify whether to allow a javaType in a source schema or to exit with an error when an instance of javaType is detected, (9) an option to specify whether source code generator 150 should attempt to clean up import statements in a generated source code module, (10) an option to specify whether JavaScript Object Notation (JSON), Jackson, or other annotations are to be added to generated source code modules, (11) an option to specify whether source code generator 150 is to add debug information as comments in generated source code modules, (12) an option to specify whether to generate immutable source code modules having an inner builder class with "morph" fields having constraints on custom types, (13) an option to specify whether to write a source schema used to generate a source code module form a source code prototype to the generated source code module (e.g., for debugging source code generator 150), or any other options that provide information and instructions to code generator 150.

At block 304, source code compiler 160 of source code generation system 130 compiles the source code prototype comprising the annotations associated with source code generator 150. In an example, a software developer compiles a Java® source code prototype comprising one or more source code generation annotations associated with source code generator 150. For example, the software developer may compile the Java® source code prototype with any Java® compiler. In an example, a software developer compiles, tests, debugs, and executes the annotated Java® source code prototype prior to generating source code modules to ensure that each source code module eventually generated from the prototype will successfully compile, execute, and operate as expected.

At block 306, data receiver 140 of source code generation system 130 receives two or more schemas each describing attributes of respective source code modules to be generated by the source code generator. In an example, data receiver retrieves and/or receives two or more schemas that each provide a specification or interface describing attributes for generating respective source code modules from a compilable, annotated source code prototype. In one example, data receiver 140 receives multiple JavaScript Object Notation (JSON), Extensible Markup Language (XML), or XML Schema Definition (XSD) schemas, that each represent attributes of respective Java® source code modules to be generated from a Java® source code prototype. For example, each schema may provide one or more of a name for the source code module to be generated, fields or variables to be generated as part of the source code module, constructor information for the source code module to be generated, accessor and mutator information for the source code module to be generated, one or more other (e.g., internal or external) source code modules to be generated in association with the source code module, etc.

At block 308, source code generator 150 of source code generation system 130 analyzes the source code prototype to generate the source code modules. In an example, source code generator 150 reads and parses a compilable, annotated source code prototype into a Document Object Model (DOM) or other representation used for processing. In one example, source code generator 150 searches a source code prototype for annotations of interest. For example, source code generator 150 may process annotations present in a source code prototype or a copy of a source code prototype based on a predetermined order.

At block 310, source code generator 150 of source code generation system 130 detects the annotations from the source code prototype as part of generating the respective source code modules. In an example, source code generator 150 analyzes a source code prototype (or a copy of the source code prototype) to identify and process a compilation unit annotation representing the root or top level of the source code module being generated. Source code generator 150 then may analyze the source code prototype to identify and process a top-level type-declaration annotation for the source code module being. Source code generator 150 then may analyze the source code prototype to identify and process field and field property annotations for the source code module being generated. Source code generator 150 then may analyze the source code prototype to identify and process accessor and mutator annotations for the source code module being generated. Source code generator 150 also generally may process annotations associated with a source code prototype in one or more different orders to generate various source code modules under different conditions.

In an example, source code generator 150 removes annotations from a copy of the source code prototype serving as an intermediate representation of a source code module that is being generated. For example, source code generator 150 may remove each annotation individually after each annotation is processed. Source code generator also may remove one or more of the annotations after every annotation has been processed accordingly. Thus, in various examples, a generated source code module, once generated, may not comprise source code generator 150 annotations that were present in an original source code prototype.

At block 312, source code generator 150 of source code generation system 130 analyzes each one of the schemas to generate each respective source code module. In an example, source code generator processes each schema to generate a corresponding source code module from a source code prototype. For example, source code generator 150 may read and parse each schema describing attributes of a source code module into a Document Object Model or other representation.

In an example, one or more of the schemas may be original and unmodified, or pre-processed to update and/or augment data from an original version of the schema. In one example, each schema comprises a root schema class having one or more definitions, one or more properties, one or more types, one or more methods, etc. In addition, one or more of the schemas may comprise one or more additional schema classes each having one or more definitions, one or more properties, one or more types, one or more methods, etc.

At block 314, source code generator 150 of source code generation system 130 determines that one or more of the annotations from the source code prototype correspond to one or more attributes of a schema associated with a respective source code module being generated. In an example, each of one or more source code generator 150 annotations in a source code prototype are associated with one or more corresponding elements in a schema describing attributes of a source code module to be generated. In one example, source code generator 150 maintains a mapping between each of one or more source code generator 150 annotations that may be used in source code prototypes and one or more corresponding schema elements that may be used in a schema comprising attributes of a source code module to be generated. For example, such mappings generally allow source code generator 150 to process source code prototype annotations in view of corresponding data provided in a schema.

In an example, source code generator 150 detects and processes annotations in a source code prototype as part of generating a source code module from a schema definition. In one example, source code generator 150 determines a next annotation to process in a source code prototype. Source code generator 150 then detects one or more instances of the annotation to process in an original or copy of the source prototype. Source code generator 150 then examines a mapping between one or more annotations and schema elements to determine which of one or more elements of a schema to use when generating a section of source code associated with the annotation(s) being processed.

At block 316, source code generator 150 of source code generation system 130 generates one or more sections of prototype source code associated with at least one of the annotations by modifying the prototype source code with data from an associated section of the schema corresponding to the respective source code module being generated. In an example, source code generator 150 identifies one or more elements of a schema associated with a source code prototype annotation as part generating a source code module from the schema. In one example, source code generator 150 modifies a section of the source code prototype associated with the annotation being processed based on one or more associated elements of the corresponding schema. Source code generator 150 also may insert one or more new sections or new statements of source code into the source code prototype based on an annotation in the source code prototype and one or more associated elements of the corresponding schema.

In an example, source code generator 150 generates or replaces source code data associated with field declaration and field property annotations with field and field property element data from a schema. Source code generator 150 further may generate or replace source code data associated with accessor and mutator annotations by iteratively processing each field declaration annotation associated with a source code module described in a schema file.

In an example, source code generator 150 completes processing of annotations in a source code prototype to generate a source code module from a schema. Source code generator 150 then continues by generating one or more additional source code modules each corresponding to other respective schemas. For example, source code generator 150 may process the annotations in a source code prototype in view of a second schema to generate a second source code module associated with the second schema. Source code generator 150 then may process the annotations in a source code prototype in view of a third schema to generate a third source code module associated with the third schema, and so on and so forth.

In an example, compiler 160 compiles one or more of the source code modules generated by source code generator 150. For example, compiler 160 may compile each of the generated source code modules automatically. In addition, one or more of the generated source code modules then may be executed by one or more processing devices.

In an example, a software developer modifies a source code prototype after generating source code modules from a series of schemas. For example, a software developer may modify a source code prototype based on a change in coding standards, based on a change in an industry specification, to improve efficiency of the generated code, or to refactor the code for any other reason. In one example, the software developer updates source code and/or annotations in the source code prototype. The software developer also may update one or more aspects of corresponding schemas independently or in association with updates to the source code prototype. The software developer then may regenerate each of the respective source code modules using the modified source code prototype and schemas to generate an updated version of each source code module based on the modified source code prototype.

Figure 4:
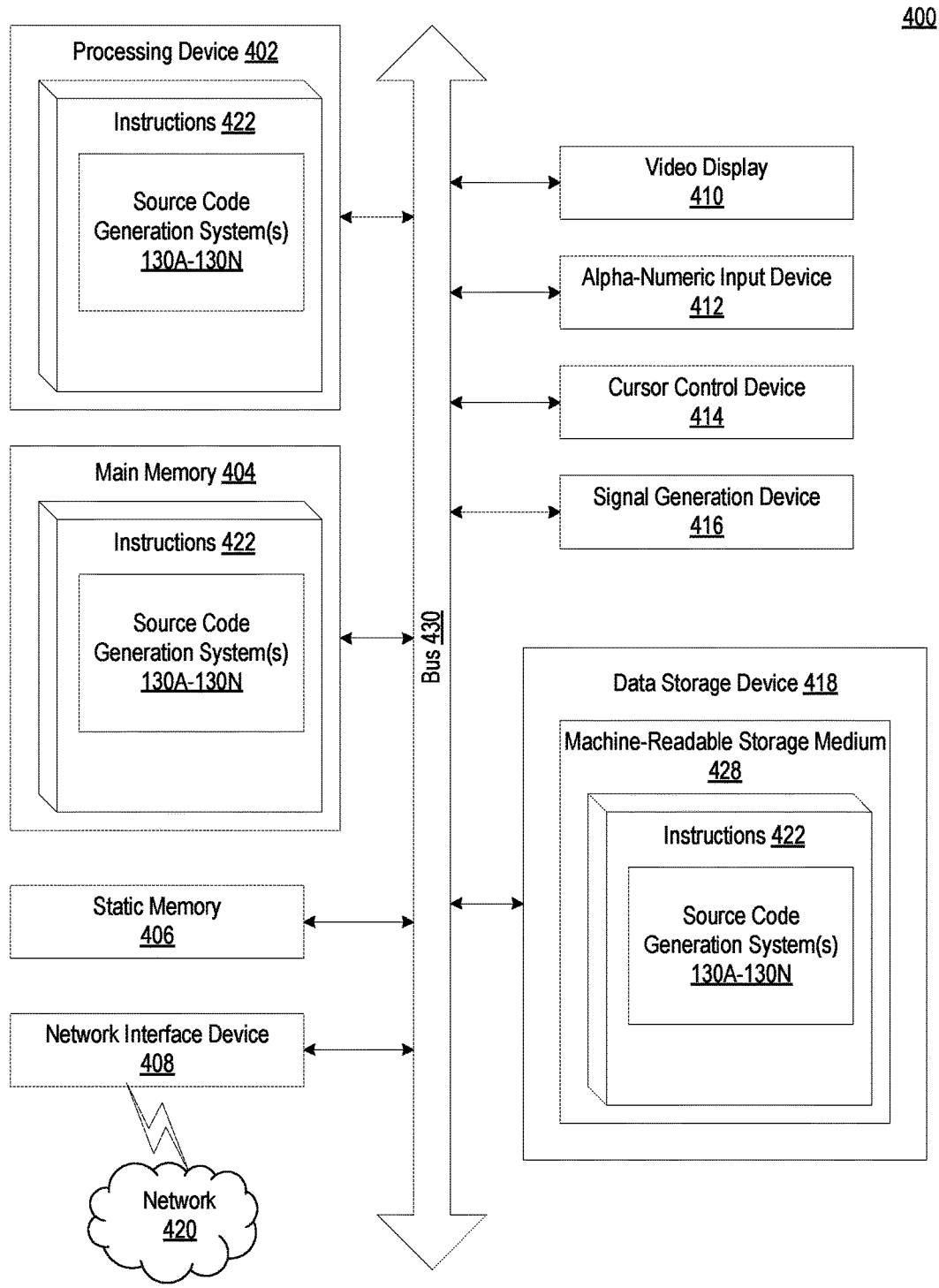
FIG. 4 is a block diagram of an exemplary computer system that may perform one or more of the operations described herein.

FIG. 4 illustrates a diagram of a machine in the exemplary form of a computer system 400, within which a set of instructions for causing the machine to perform any one or more of the methodologies discussed herein may be executed. In other examples, the machine may be connected (e.g., networked) to other machines in a LAN, an intranet, an extranet, or the Internet. The machine may operate in the capacity of a server or a client device in client-server network environment, or as a peer machine in a peer-to-peer (or distributed) network environment. The machine may be a personal computer (PC), a tablet PC, a set-top box (STB), a Personal Digital Assistant (PDA), a cellular telephone, a wearable computing device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM), double data rate (DDR SDRAM), or DRAM (RDRAM), etc.), a static memory 406 (e.g., flash memory, static random access memory (SRAM), etc.), and a data storage device 418, which communicate with each other via a bus 430.

Processor 402 represents one or more general-purpose processing devices such as a microprocessor, central processing unit, multi-core processor, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 also may be one or more special-purpose processing devices such as an application specific integrated circuit (ASIC), a field programmable gate array (FPGA), a digital signal processor (DSP), network processor, or the like. The processor 402 is configured to execute instructions 422 for performing the operations and steps discussed herein.

The computer system 400 also may include a network interface device 408. The computer system 400 may further include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-readable storage medium 428 on which is stored one or more sets of instructions 422 (e.g., software computer instructions) embodying any one or more of the methodologies or functions described herein. The instructions 422 also may reside, completely or at least partially, within the main memory 404 and/or within the processor 402 during execution thereof by the computer system 400, the main memory 404 and the processor 402 also constituting computer-readable storage media. The instructions 422 may be transmitted or received over a network 420 via the network interface device 408.

In one example, the instructions 422 include instructions for one or more modules of a source code generation system (e.g., source code generation system 130-130N of FIG. 1) and/or a software library containing methods that call a source code generation system 130-130N. While the computer-readable storage medium 428 (machine-readable storage medium) is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" also may include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Numerous details are set forth in the foregoing description. However, it will be apparent to one of ordinary skill in the art having the benefit of this disclosure that the present disclosure may be practiced without these specific details. In some instances, well-known structures and devices are shown in block diagram form, rather than in detail, to avoid obscuring the present disclosure.

Some portions of the detailed description have been presented in terms of algorithms and symbolic representations of operations on data bits within a computer memory. Here, an algorithm is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing," "comparing," "associating," "applying," "transmitting," "receiving," "processing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples will be apparent to those of skill in the art upon reading and understanding the above description. The scope of the disclosure therefore should be determined with reference to the appended claims, along with the full scope of equivalents to which such claims are entitled.

What is claimed is:

1. A computer system, comprising:
   a non-transitory memory storing instructions; and
   one or more processors coupled to the non-transitory memory and configured to execute the instructions from the non-transitory memory to cause the system to perform operations comprising:
   validating, by a compiler of a computer language, a source code generation prototype comprising annotations prior to generating a first and second source code modules;
   receiving two or more schemas each comprising respective attributes corresponding to one or more of the annotations in the source code generation prototype;
   creating a respective copy of the source code generation prototype for each one of the schemas;
   generating a first source code module by modifying a first copy of the source code generation prototype created for the first schema based on mappings between the respective attributes of the first schema and corresponding annotations of the source code generation prototype, the first source code module being generated in the computer language; and
   generating a second source code module by modifying a second copy of the source code generation prototype created for the second schema based on mappings between the respective attributes of the second schema and corresponding annotations of the source code generation prototype, the second source code module being generated in the computer language.

2. The computer system of claim 1, wherein the operations further comprise:
   searching the source code prototype for respective annotations corresponding to each one of the attributes in one of the schemas based on the mappings.

3. The computer system of claim 1, wherein the first source code module and the second source code module are generated based on a predetermined processing order associated with the source code generation prototype annotations.

4. The computer system of claim 1, wherein the operations further comprise:
   modifying a section of code in the copy of the source code generation prototype created for the first schema based on a mapping between a respective one of the annotations associated with the section of code and a corresponding attribute in the first schema.

5. The computer system of claim 1, wherein the operations further comprise:
   inserting one or more new sections of source code into the first copy of the source code generation prototype based on a mapping between one of the annotations in first copy of the source code generation prototype and one of the attributes in the first schema.

6. The computer system of claim 1, wherein the operations further comprise:
   compiling one of more of the source code modules generated from the schemas and the source code generation prototype.

7. The computer system of claim 1, wherein the operations further comprise:
   executing one or more of the source code modules generated from the schemas and the source code generation prototype.

8. The computer system of claim 1, wherein one or more of the schemas are associated with an Extensible Markup Language (XML) data format.

9. The computer system of claim 1, wherein the source code modules are generated, at least in part, with assistance of a plug-in associated with a software development environment.

10. The computer system of claim 1, wherein the source code generation prototype generates immutable objects comprising morph fields, wherein each morph field comprises multiple different versions of respective morph field data that are kept in sync.

11. The computer system of claim 1, wherein source code generation prototype comprises one or more top-level class annotations and one or more builder class annotations.

12. The computer system of claim 1, wherein source code generation prototype comprises one or more top-level class annotations, one or more builder class annotations, and one or more nested inner class annotations.

13. The computer system of claim 1, wherein source code generation prototype comprises one or more top-level class annotations, one or more builder class annotations, one or more nested inner class annotations, and one or more array-type annotations.

14. A non-transitory computer-readable medium having stored thereon machine-readable instructions executable to cause a machine to perform operations comprising:
   maintaining a mapping between each one of a plurality of source code generation annotations and respective source code generation attributes available for use in source code generation schemas, the source code generation annotations comprising at least one top-level class annotation, at least one builder class annotation, and at least one nested inner class annotation;
   receiving a source code generation prototype comprising a plurality of the source code generation annotations, the source code generation prototype being written in a computer language;
   validating the source code generation prototype using a compiler of the computer language;
   receiving a first source code generation schema comprising a first subset of one or more of the source code generation attributes, each one of the source code generation attributes in the first subset being associated with a respective source code generation annotation in the mapping;
   receiving a second source code generation schema comprising a second subset of one or more of the source code generation attributes, each one of the source code generation attributes in the second subset being associated with a respective source code generation annotation in the mapping;
   generating a first source code module from the first source code generation schema and the source code generation prototype, at least in part, based on the respective mappings between the source code generation attributes in the first source code generation schema and the source code generation annotations in the source code generation prototype; and
   generating a second source code module from the second source code generation schema and the source code generation prototype, at least in part, based on the respective mappings between the source code generation attributes in the second source code generation schema and the source code generation annotations in the source code generation prototype.

15. The non-transitory computer-readable medium of claim 14, wherein one or more of the schemas are associated with an Extensible Markup Language Schema Definition (XSD) data format.

16. The non-transitory computer-readable medium of claim 14, wherein the source code modules are generated, at least in part, via a code generation application programming interface (API).

17. A computer-implemented method, comprising:
   maintaining a mapping between each one of a plurality of source code generation annotations and respective source code generation attributes available for use in source code generation schemas, the source code generation annotations comprising at least two or more of a top-level class annotation, a builder class annotation, a nested inner class annotation, or an array-type annotation;
   receiving a source code generation prototype comprising a plurality of the source code generation annotations;
   validating the source code generation prototype using a compiler of the computer language;
   receiving a first schema comprising a first subset of one or more of the source code generation attributes, each one of the source code generation attributes in the first subset being associated with a respective source code generation annotation in the mapping;
   receiving a second schema comprising a second subset of one or more of the source code generation attributes, each one of the source code generation attributes in the second subset being associated with a respective source code generation annotation in the mapping;
   generating a first source code module from the first schema and the source code generation prototype, at least in part, based on the respective mappings between the source code generation attributes in the first source code generation schema and the source code generation annotations in the source code generation prototype; and
   generating a second source code module from the second schema and the source code generation prototype, at least in part, based on the respective mappings between the source code generation attributes in the second source code generation schema and the source code generation annotations in the source code generation prototype.

18. The computer-implemented method of claim 17, wherein the object-oriented language is the Java® computer language, and wherein one or more of the first schema and the second schema are JSON schemas.

19. The computer-implemented method of claim 17, wherein the source code generation prototype generates at least one morph field that maintains two or more different versions of a respective data element that are kept in sync when a change occurs in one of the other different versions of the respective data element.

* * * * *